Aug. 11, 1959

N. H. JEFFERY 2,898,631

METHOD OF FORMING ARTICLES FROM SILICONE
ELASTOMERS AND POLYTETRA FLUOROETHYLENE
Filed Dec. 18, 1956

Inventor
Norman Howard Jeffrey by
Leech and Radue
Attorneys

United States Patent Office 2,898,631
Patented Aug. 11, 1959

2,898,631

METHOD OF FORMING ARTICLES FROM SILICONE ELASTOMERS AND POLYTETRA FLUOROETHYLENE

Norman Howard Jeffery, Mickleover, England, assignor to Rolls-Royce Limited, Derby, England, a British company Application December 18, 1956, Serial No. 629,111

Claims priority, application Great Britain December 21, 1955

5 Claims. (Cl. 18—47.5)

This invention is for improvements in the manufacture of articles from silicone elastomer with which is incorporated polytetrafluoroethylene commonly and hereinafter called P.T.F.E.

P.T.F.E. may be incorporated into unvulcanised silicone elastomer by means of a conventional two-roll rubber mixing mill and this produces a laminar structure in which layers or strata of P.T.F.E. or rich in P.T.F.E. are interspersed with layers of pure or comparatively pure silicone elastomer. These layers lie in planes essentially parallel to the plane of the rolled sheet and this laminar heterogeneous structure tends to persist during all subsequent operations.

Such a structure may be an advantage where the final product is used as a thin sheet, such as for gaskets; but where more complicated articles are required, such as circular rings for sealing purposes, the disposition of these P.T.F.E. or P.T.F.E.-rich layers becomes of extreme importance, and articles moulded from the conventional type of pellet or annular blank cut from the rolled sheet show undesirable distribution of the laminae, giving variable properties depending upon the direction in which such properties are measured.

This difficulty may be overcome by extruding the laminated sheet so that the issuing length of the material has a cross-sectional area of the order of that required in the finished article and exhibits a structure of concentric, or approximately concentric, rings of P.T.F.E. or P.T.F.E.-rich material alternating with rings of pure, or approximately pure silicone elastomer, the article subsequently being moulded from one turn of the extruded length. This gives rise, however, to the disadvantage that the resulting joint may weaken the article.

According to the present invention a laminated sheet of silicone elastomer and P.T.F.E. is extruded through a hole of small diameter whereby a thread is produced exhibiting in cross-section a structure of concentric, or approximately concentric, rings of P.T.F.E. or P.T.F.E.-rich material alternating with rings of pure, or approximately pure silicone elastomer and an article is subsequently moulded from a coil consisting of at least four continuous turns of such thread.

Preferably the direction of extrusion is transverse to the plane of the laminations.

Thus, if a circular sealing ring is required a coil of appropriate diameter is produced by coiling the thread at least four times, for example, by winding around a mandrel.

The invention is also applicable to the manufacture of solid articles which may be produced by making a coil of negligible internal diameter, for example, by winding the thread around a wire.

An example of the method employed according to this invention is illustrated in the accompanying drawings in which.

Figure 5:
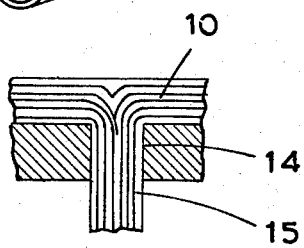

Figure 5 on a smaller scale part of the die and block during the process of extrusion.

Figure 4:
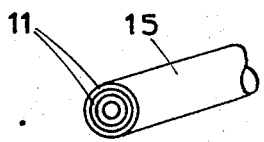
Figure 4 shows on a large scale an extruded thread.
Figure 6:
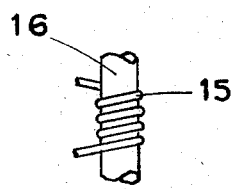

Figure 6 shows the thread illustrated in Figure 4 wound on the mandrel, and

Figure 7:
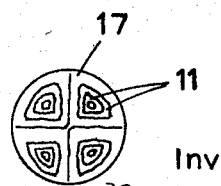

Figure 7 is a cross section of a moulded ring made from the turns of thread illustrated in Figure 6.

Figure 1:
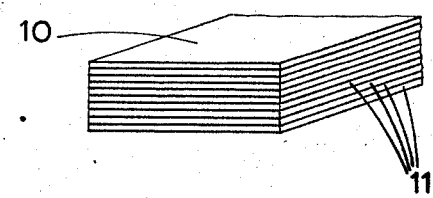
Figure 1 shows a block cut from a laminated piece of P.T.F.E. enriched silicone elastomer.
Figure 2:
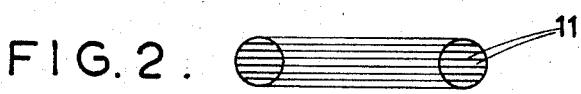
Figure 2 is a section through a circular ring made from a blank cut from a block illustrated in Figure 1.

The block 10 is formed of a silicone elastomer having layers 11 enriched with P.T.F.E. shown by darker lines running in parallel planes through the block. If a ring is cut from such a block the P.T.F.E. rich layers will still be in parallel planes as shown in Figure 2.

Figure 3:
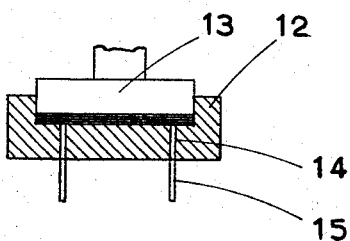
Figure 3 shows diagrammatically the block illustrated in Figure 1 being extruded.

As shown in Figure 3 the block 10 is inserted in a rectangular die 12 and has a press 13 applied to it, the pressure being of the order of 20 tons to the square inch.

Through the base of the block are four holes 14 of approximately 50 to 60 thousandths of an inch in diameter.

In Figure 5 is shown an enlargement of the thread 15 being extruded through the hole from which will be seen how the P.T.F.E. rich layers flow. When extruded the thread is composed of roughly concentric layers of sheaths and as shown in cross-section in Figure 4 with these layers in approximately concentric circles. Its diameter after extrusion will be approximately 80 thousandths of an inch.

The thread 15 is then wound on a mandrel 16 being given at least four turns and is then moulded.

Figure 7 shows a section 17 through the ring which is moulded from the four turns of thread shown in Figure 6. Each of the turns has now become a segment of a circle with the P.T.F.E. rich layers concentrically arranged within it.

By this means the properties of the ring are much more constant when measured in any direction than they are in a ring made from a block cut direct from the laminated block as it leaves the two-roll mixing mill (as shown in Figure 2) due to the concentric arrangement of the P.T.F.E. layers. Moreover, by employing at least four turns the positions of weakness in the finished ring, corresponding to the cut ends of the thread cannot at any position effect more than 40% of the cross-sectional area as compared with 100% weakened area in the case of rings moulded from one turn of extruded thread. Further, by employing a whole number of turns plus a fraction of a turn, for example 4½ turns, the weakened area, at any position, is reduced to 20% of the total cross-section.

I claim:

1. The method of forming an article from a silicone elastomer with which is incorporated polytetrafluoroethylene which comprises laminating thin layers consisting substantially entirely of a silicone elastomer with alternate layers consisting substantially entirely of polytetrafluoroethylene into a thick sheet, extruding said sheet through a hole of small diameter in such a manner that a solid thread is produced comprising roughly concentric sheaths alternately having the compositions of said layers, forming at least a four turn coil of said thread and moulding the article from the coil so produced.

2. The method claimed in claim 1 in which the alternate layers are flat and the direction of extrusion is transverse to the plane of lamination.

3. Forming a sealing washer by the method set forth in claim 2 in which a coil of appropriate shape and internal size is produced by winding the thread about a mandrel prior to moulding.

4. Forming a solid article by the method claimed in claim 1 which includes winding the laminated thread into a helix whose inside diameter is less than thread diameter and confining the helix and compressing it axially.

5. The method claimed in claim 1 in which the extrusion step includes placing a thick laminated sheet in a die having a base shaped so that the sheet laminations are parallel thereto, said base having a number of holes in the range of 50 to 60 thousandths of an inch in diameter arranged normal to said base and applying pressure to the sheet in said die to cause extrusion of the elastomer through the holes in the form of threads.

References Cited in the file of this patent

UNITED STATES PATENTS

| | | |
|---|---|---|
| 2,516,065 | McElligott | July 18, 1950 |
| 2,648,098 | McElligott | Aug. 11, 1953 |
| 2,682,292 | Nagin | June 29, 1954 |